United States Patent
Kaply (12)

(10) Patent No.: US 6,215,490 B1
(45) Date of Patent: *Apr. 10, 2001

(54) TASK WINDOW NAVIGATION METHOD AND SYSTEM

(75) Inventor: Michael Aaron Kaply, Austin, TX (US)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/016,983

(22) Filed: Feb. 2, 1998

(51) Int. Cl.$^7$ ........................................................ G06F 3/14
(52) U.S. Cl. .................. 345/340; 345/339; 345/342; 345/343; 345/345; 345/974
(58) Field of Search ............................. 345/340, 342, 345/345, 974, 343, 339, 145

(56) References Cited

U.S. PATENT DOCUMENTS

| | | | |
|---|---|---|---|
| 5,140,678 | 8/1992 | Torres | 395/159 |
| 5,377,317 | 12/1994 | Bates et al. | 395/159 |
| 5,412,775 * | 5/1995 | Maeda et al. | 345/344 |
| 5,491,795 | 2/1996 | Beaudet et al. | 395/159 |
| 5,590,265 | 12/1996 | Nakazawa | 395/340 |
| 5,602,996 * | 2/1997 | Power, III et al. | 345/338 |
| 5,617,526 * | 4/1997 | Oran et al. | 345/348 |
| 5,710,574 * | 1/1998 | Jaaskelainen, Jr. | 345/145 |
| 5,757,371 * | 5/1998 | Oran et al. | 345/339 |
| 5,784,067 * | 7/1998 | Ryll et al. | 345/145 |
| 5,850,531 * | 12/1998 | Cox et al. | 345/340 |
| 5,859,638 * | 1/1999 | Coleman et al. | 345/341 |
| 5,892,511 * | 4/1999 | Gelsingler et al. | 345/345 |

FOREIGN PATENT DOCUMENTS 7-73003   9/1993  (JP) .

* cited by examiner

Primary Examiner—Raymond J. Bayerl
Assistant Examiner—Thomas T. Nguyen
(74) Attorney, Agent, or Firm—Duke W. Yee; Jeffrey S. LaBaw (57) ABSTRACT

A method of managing a plurality of windows organized and displayed on the graphical user interface of a computer. At any given time, one of the plurality of windows has a focus on the graphical user interface and a remainder of the windows are at least partly obscured behind the window having the focus. The method begins by displaying a graphical control device on the GUI, The graphical control device preferably has a plurality of identifiers each of which is associated with a given one of the plurality of windows. Thus, the graphical control device may be a slider, with each of the identifiers being a "notch". As the graphical pointer is moved in a predetermined manner relative to the notches, respective windows are selectively positioned at the focus position on the GUI. Thus, the user may easily locate any desired window by traversing the graphical pointer across the slider notches. As each notch is traversed, the window associated therewith is brought into the focus position. This is a fast and simple technique for locating a hidden or partially obscured window on the interface.

46 Claims, 7 Drawing Sheets

TASK WINDOW NAVIGATION METHOD AND SYSTEM

BACKGROUND OF THE INVENTION

1. Technical Field

The present invention relates in general to a method and system for data processing and in particular to an improved method and system of user interface to a data processing system. Still more particularly, the present invention relates to an improved method and system for accessing a particular task window on a graphical user interface in which a plurality of such windows are already opened in an overlapped manner to bring the task window into focus.

2. Description of the Related Art

The windows-based graphical user interface (GUI) provides a user with a graphical and intuitive display of information. When used in conjunction with a conventional multitasking operating system, the GUI allows many different applications to run concurrently in multiple task windows. Thus, for example, a user connected within a typical local area network (LAN) enterprise environment may have opened on his or her computer many varied programs, such as a word processing program, an e-mail program, a Web browser, and the like. Each program typically has associated therewith its own task window (and possibly other modal windows). A particular task may also be associated with an icon located on a task bar, if the task bar is visible.

In such an environment, however, task windows tend to get "lost" behind other windows. In particular, users often run into situations where they are unable to locate a particular window that they are required to interact with. Currently, the usual solution to this problem is to list all windows in an accessible task list. When the list is displayed, the user can then move through the task list manually, usually by striking the "Tab" key while simultaneously holding down the "Alt" key on a conventional keyboard (in the Windows 95 operating system). While this "Alt"-"Tab" keyboard technique does enable the user to identify all open windows identified in the task list, it is cumbersome and sometimes difficult to use in practice. The task list is not displayed persistently, but must be accessed using a keyboard command. Moreover, certain windows, however, may not be identified by tasks in the list.

Another approach is to call out a different window by clicking on an icon in the task bar, which is usually positioned along the an edge of the display screen. This approach is also helpful, but all windows may not be identified or easily located on the task bar, especially when multiple versions of the same application are running (e.g., as would occur if multiple documents were being edited concurrently). The task bar selection process is also quite cumbersome.

There remains a need to provide an efficient and simple technique for enabling a user to locate and access all open windows (and tasks) in a graphical user interface windowing environment. The present invention solves this problem.

SUMMARY OF THE INVENTION

The present invention addresses the deficiencies of the prior art by displaying on a graphical user interface a convenient graphical control device (e.g., a slider, scrollbar or knob) that allows a user to navigate through a hierarchy of windows in the GUI and, in particular, to selectively place a given window at the "focus" or active position on the display screen.

The graphical control device is useful in a method for managing a plurality of windows organized and displayed on the graphical user interface of a computer. At any given time, one of the plurality of windows has a focus on the graphical user interface and a remainder of the windows are at least partly obscured behind the window having the focus. The method begins by displaying the graphical control device on GUI. The graphical control device has a plurality of identifiers each of which is preferably associated with a given one of the plurality of windows. Thus, if the graphical control device is a slider, each of the identifiers is a "notch" on the slider. As the graphical pointer (or some control element of the slides) is moved in a predetermined manner relative to the notches, respective windows are selectively positioned at the focus position on the GUI. Thus, the user may easily locate any desired window by traversing the graphical pointer across the slider notches. As each notch is traversed, the window associated therewith is brought into the focus position. This is a much faster and simpler technique for locating a hidden or partially obscured window on the interface than exists in the prior art.

The method is also useful for managing multiple tasks that may be executing on a computer. In particular, each of the tasks is assumed to have a graphical user interface task window associated therewith. At any given time, one of the plurality of task windows has a focus on the graphical user interface and a remainder of the task windows are at least partly obscured behind the task window having the focus. As in the earlier embodiment, the graphical control device having a plurality of identifier positions is displayed on the graphical user interface. The graphical control device need not be associated with any particular task window, task bar or other control element. As the user moves the graphical pointer relative to the identifier positions, respective task windows are selectively positioned at the focus position. Once the user locates the desired task window in the focus position, the user may take a predetermined action (e.g., a control action, entry of data, etc.) with respect to the task. The graphical control device thus enables the user to quickly locate any executing task in an computer running a multitasking operating system.

Thus, the present invention provides a graphical control device, such as a slider, that preferably "floats" on the interface as a plurality of task windows are opened. As the user moves the graphical pointer or other control element across each "notch" of the control device, the task window located at the focus position changes. A given task window is positioned at the focus of the graphical user interface as the graphical pointer traverses the notch associated with that window.

Thus, it is a general object of the present invention to provide an improved method and system of user interface within a computer wherein a user may quickly navigate to any open task running on the data processing system.

It is yet another more general object of the invention to enable a user to interact with windows and tasks within the graphical user interface (GUI) of a data processing system.

The above as well as additional objects, features, and advantages of the present invention will become apparent in the following detailed written description.

BRIEF DESCRIPTION OF THE DRAWINGS

The novel features believed characteristic of the invention are set forth in the appended claims The invention itself however, as well as a preferred mode of use, further objects and advantages thereof, are best understood by reference to the following Detailed Description of an illustrative embodiment when read in conjunction with the accompanying Drawings, wherein:

DETAILED DESCRIPTION OF PREFERRED EMBODIMENT

Figure 1:
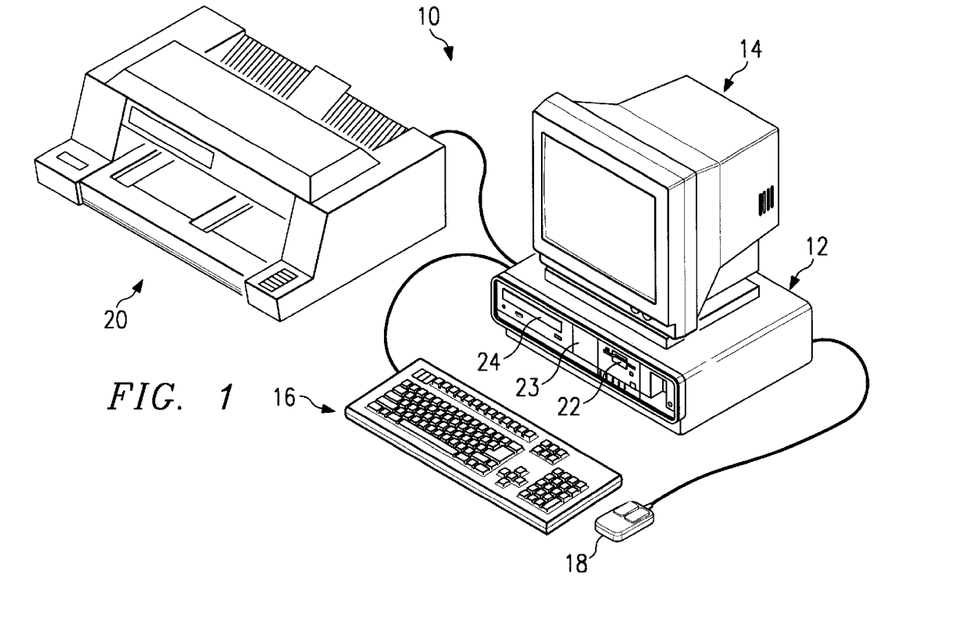
FIG. 1 is a pictorial representation of a data processing system which may be utilized to implement the method and system of the present invention.

With reference now to the figures and in particular with reference to FIG. 1, there is illustrated a preferred embodiment of a computer in which the present invention is implemented. As illustrated, data processing system 10 includes system unit 12, display device 14, keyboard 16, mouse 18, and printer 20. System unit 12 receives data for processing from input devices such as keyboard 16, mouse 18, or local area networking interfaces (not illustrated). Mouse 18 is preferably utilized in conjunction with a graphical user interface (GUI) in which hardware and software system objects, including data processing system components and application programs, are controlled through the selection and manipulation of associated graphical objects displayed within display device 14. Although data processing system 10 is illustrated with mouse 18, those skilled in the art will recognize that other graphical pointing devices, including a graphics tablet, stylus, light pen, joystick, puck, trackball, trackpad, and the IBM TrackPoint™ can also be utilized. Data processing system 10 presents output data to a user via display device 14 and printer 20. To support storage and retrieval of data, system unit 12 further includes diskette drive 22, hard disk drive 23, and CD-ROM drive 24, which are connected to system unit 12 in a well-known manner. Of course, those skilled in the art are aware that other conventional components can also be connected to system unit 12.

Figure 2:
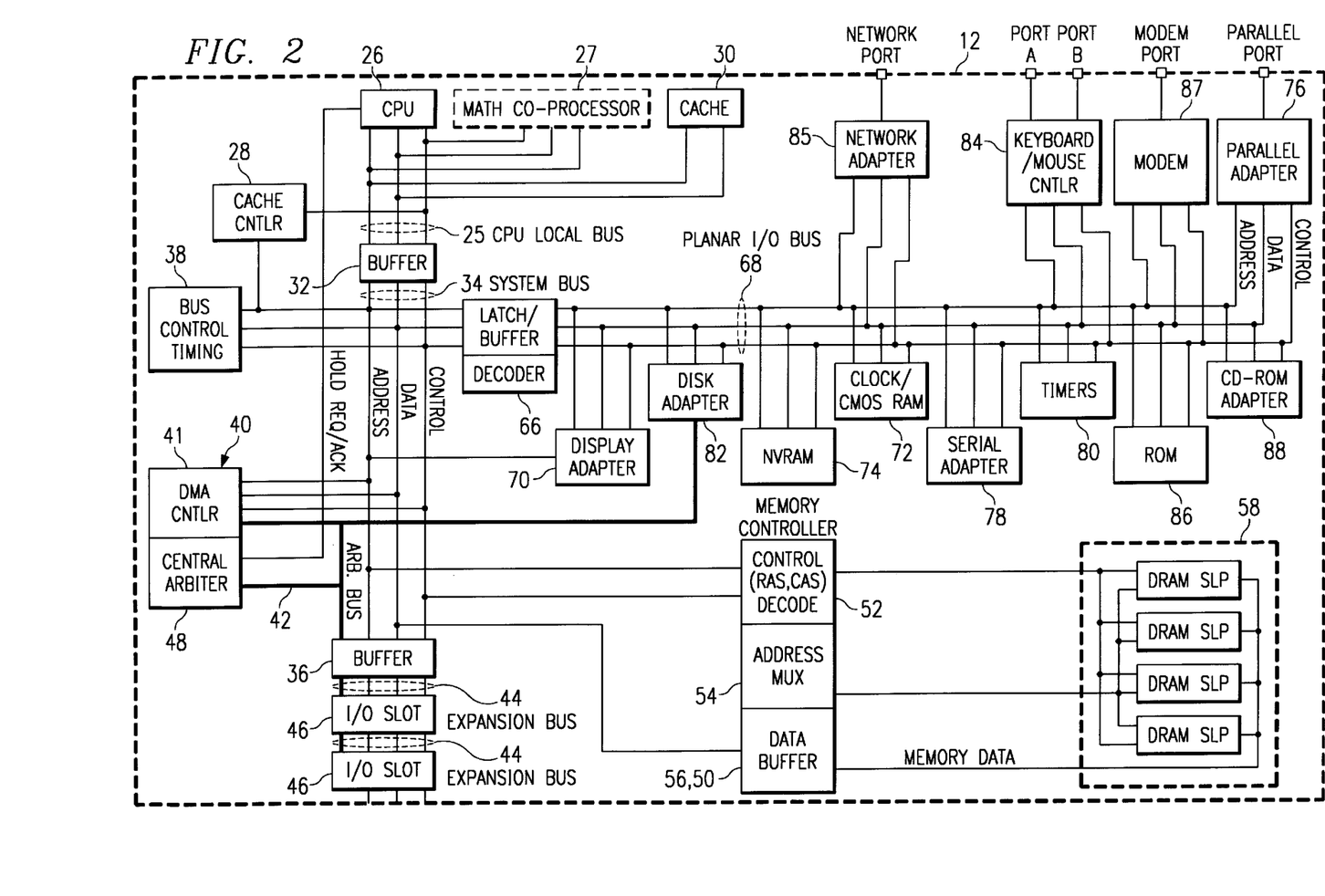
FIG. 2 depicts a block diagram of the system unit of the data processing system illustrated in FIG. 1.

Referring now to FIG. 2, there is depicted a block diagram of the principal components of system unit 12 of data processing system 10. As illustrated, system unit 12 includes a central processing unit (CPU) 26 which executes software instructions. While any appropriate microprocessor can be utilized for CPU 26, CPU 26 is preferably one of the PowerPC™ line of microprocessors available from IBM Microelectronics. Alternatively, CPU 26 can be implemented as one of the x86-type microprocessors, which are available from a number of vendors such as Intel. In addition to CPU 26, an optional math coprocessor 27, cache controller 28, and cache memory 30 are coupled to high-speed CPU local bus 25. Math coprocessor 27 is an optional processor, distinct from CPU 26, that performs mathematic computations with greater efficiency than CPU 26. Math coprocessor 27 is optional since the performance advantage provided by a math coprocessor may be achieved by enhancements to CPU 26, such as the implementation of multiple floating-point execution units. Cache memory 30 comprises a small high-speed memory which stores frequently accessed data and instructions. The operation of cache 30 is controlled by cache controller 28, which maintains a directory of the contents of cache 30 and enforces a selected cache coherency protocol.

CPU local bus 25 is coupled to buffer 32 to provide communication between CPU local bus 25 and system bus 34, which extends between buffer 32 and a further buffer 36. System bus 34 is connected to bus control and timing unit 38 and direct memory access (DMA) unit 40, comprising central arbiter 48 and DMA controller 41. DMA controller 41 supports memory accesses that do not involve CPU 26. Direct memory accesses are typically employed to transfer data directly between RAM 58 and an "intelligent" peripheral device, such as disk adapter 82. DMA requests from multiple peripheral devices are arbitrated by central arbiter 48. As described below, central arbiter 48 also regulates access to devices coupled to expansion bus 44 by control signals transmitted via arbitration control bus 42.

CPU 26 accesses data and instructions from and stores data to volatile random access memory {RAM) 58 through memory controller 50, which comprises memory control unit 50, address multiplexer 54, and data buffer 56. Memory control unit 52 generates read enable and write enable signals to facilitate storage and retrieval of data and includes address translation facilities that map virtual addresses utilized by CPU 26 into physical addresses within RAM 58. RAM 58 comprises a number of individual volatile memory modules which store segments of operating system and application software while power is supplied to data processing system 10. The software segments are partitioned into one or more virtual memory pages which each contain a uniform number of virtual memory addresses. When the execution of software requires more pages of virtual memory that can be stored within RAM 58, pages that are not currently needed are swapped with the required pages, which are stored within nonvolatile storage devices 22–24. Memory controller 50 further includes address multiplexer 54, which selects particular addresses within RAM 58, and data buffer 56, which buffers data read from and stored to RAM 58. Memory controller 50 also provides memory protection that isolates system processes and user processes within the virtual address space allocated to each process.

Still referring to FIG. 2, buffer 36 provides an interface between system bus 34 and expansion bus 44. Connected to expansion bus 44 are a number of I/O slots 46 for receiving adapter cards which may be further connected to an I/O device or memory. Arbitration control bus 42 couples DMA controller 41 and central arbiter 48 to I/O slots 46 and disk adapter 82. By implementing a bus arbitration protocol, central arbiter 48 regulates access to expansion bus 44 by extension cards, controllers, and CPU 26. In addition, central arbiter 48 arbitrates for ownership of expansion bus 44 among the bus masters coupled to expansion bus 44. Bus master support allows multiprocessor configurations of expansion bus 44 to be created by the addition of bus master adapters containing a processor and its support chips.

System bus 34 is coupled to planar I/O bus 68 through buffer 66. Attached to planar I/O bus 68 are a variety of I/O adapters and other peripheral components, including display adapter 70, disk adapter 82, nonvolatile RAM 74, clock 72, serial adapter 78, timers 80, read only memory (ROM) 86, CD-ROM adapter 88, keyboard/mouse controller 84, network adapter 85, modem 87, and parallel adapter 76. Display adapter 70 translates graphics data from CPU 26 into R, G, and B video signals utilized to drive display device 14. Depending upon the operating system and application software running, the visual output may include text, graphics, animation, and multimedia video. Disk adapter 82 controls the storage of data to and the retrieval of data from hard disk drive 24 and diskette drive 22. Disk adapter 82 handles tasks such as positioning the read/write heads within drives 22 and 23 and mediating between drives 22 and 23 and CPU 26. Nonvolatile RAM 14 stores system configuration data that describes the present configuration of data processing system 10.

Clock 72 is utilized by application programs executed by CPU 26 for time of day calculations. Serial adapter 78 provides a synchronous or asynchronous serial interface which enables data processing system 10 to communicate with a remote data processing system or peripheral device. Serial communication is governed by a serial communication protocol such as RS-232, RS-422, or the like. Timers 80 comprise multiple interval timers which may be utilized by application or operating system software to time one or more selected events within data processing system 10.

ROM 86 typically stores a basic input/output system (BIOS) which provides user-transparent I/O when CPU 26 is operating under the DOS operating system. BIOS also includes power on self-test (POST) diagnostic routines which perform system set up at power on. CD-ROM adapter 88 interfaces CD-ROM drive 24 with planar I/O bus 34 to support retrieval of data from an optical disk loaded within CD-ROM drive 24. Keyboard/mouse controller 84 interfaces system unit 12 with keyboard 16 and a graphical pointing device such as mouse 18.

Finally, system unit 12 includes network adapter 85, modem 87, and parallel adapter 76, which facilitate communication between data processing system 10 and peripheral devices or other data processing systems.

Network adapter 85 is utilized to connect data processing system 10 to an unillustrated local area network (LAN) or other computer network. Modem 87 supports communication between data processing system 10 and another data processing system over a standard telephone line. Parallel port 76 transmits printer control signals and output data to printer 20 through a parallel port. At start up, a "boot strap" or primary operating system loader is run to load segments of an operating system (OS) 100 (see FIG. 3) into RAM 58 and launch execution of OS 100.

Generalizing, the computer used in the present invention is any personal computer or workstation client or server platform that is Intel®-, PowerPC®- or RISC-based, and that includes an operating system such as IBM® OS/2®, Microsoft Windows NT 4.0, Microsoft Windows 95, Unix, AIX®, OS/400 or the like.

Figure 3:
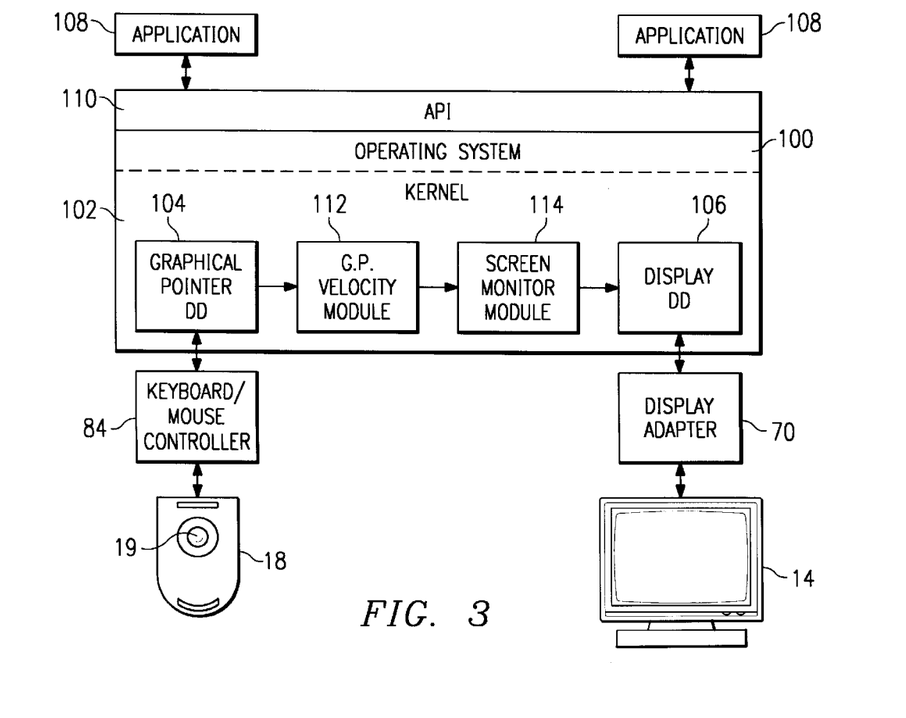
FIG. 3 illustrates a conceptual diagram of the interaction between a graphical pointing device, the software configuration utilized by the present invention, and a display device.

With reference now to FIG. 3, there is illustrated a pictorial representation of the software configuration of data processing system 10 following power-on. As depicted, the software configuration of data processing system 10 comprises OS 100, which includes kernel 102, and one or more applications 108, which communicate with OS 100 through Application Programming Interface (API) 110. Kernel 102 comprises the lowest level of OS 100 that controls the operation of the hardware components of data processing system 10 through device drivers, such as graphical pointer device driver 104 and display device driver 106.

As illustrated, graphical pointer device driver 104 and display device driver 106 communicate with keyboard/mouse controller 84 and display adapter 70, respectively, to support the interconnection of mouse 18 (illustrated in a bottom view) and display device 14 with data processing system 10. In response to movement of the trackball of mouse 18, mouse 18 transmits an analog graphical pointer signal to keyboard/mouse controller 84 that describes the direction and rotation of trackball 19. Keyboard/mouse controller 84 digitizes the analog graphical pointer signal and transmits the digitized graphical pointer signal to graphical pointer device driver 104, which thereafter interprets the digitized graphical pointer signal and routes the interpreted graphical pointer signal to graphical pointer velocity module 112 within kernel 102. Graphical pointer velocity module 112 modifies the interpreted graphical pointer signal to retard or accelerate the rate of movement of the graphical pointer manipulated utilizing mouse 18. Graphical pointer velocity module then passes the modified and interpreted graphical pointer signal to screen monitor module 114, which performs GUI actions based on the position of the graphical pointer within display device 14. For example, screen monitor module 114 causes a window to surface within a GUI in response to a user selection of a location within the window. Finally, the graphical pointer signal is passed to display device driver 106, which routes the data within the graphical pointer signal and other display data to display adapter 70, which translates the display data into the R, G, and B signals utilized to drive display device 14. Thus, the movement of trackball 19 of mouse 18 results in a corresponding movement of the graphical pointer displayed within display device 14.

Figure 4:
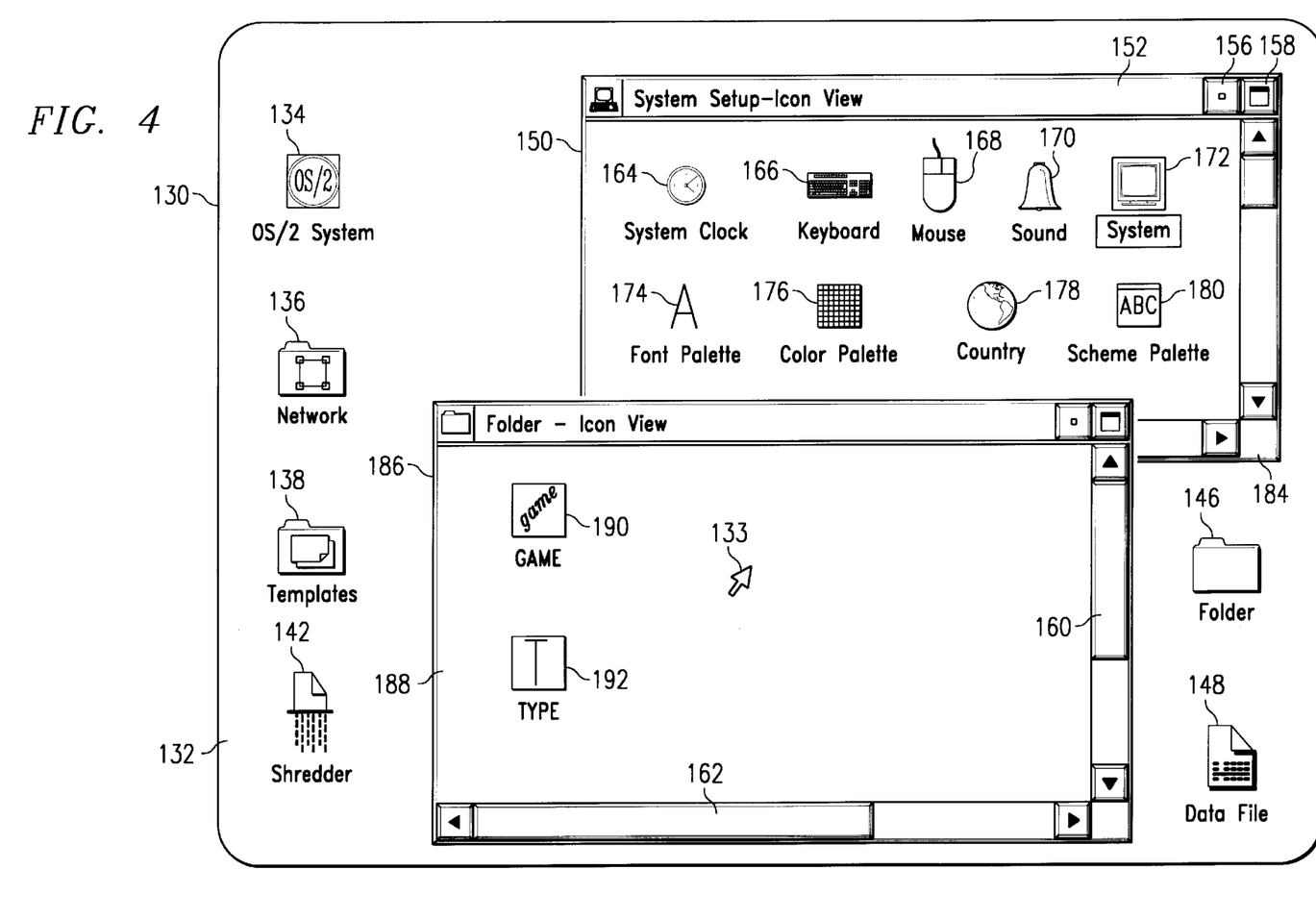
FIG. 4 depicts a pictorial representation of a desktop displayed within the display device of the data processing system illustrated in FIG. 1.

Referring now to FIG. 4, there is depicted a preferred embodiment of the graphical user interface (GUI) employed by OS 100. Screen 130 displayed to a user within display device 14 includes a background desktop 132 upon which a plurality of user-selectable icons 134–148 are displayed. Each icon 134–148 represents a program, function, or file storage area, which a user can conveniently select utilizing graphical pointer 133 by single-clicking or double-clicking the left button of mouse 18. The graphical pointer 133 is illustrated as an arrow, but this is not a limitation of the invention. Any convenient representation may be used by altering a bitmap representing the device. When a user selects one of icons 134–148, the function corresponding to the selected icon is activated and the selected icon is highlighted. Many of icons 134–148 have an associated window or series of windows that are displayed when the icon is selected. For example, when OS/2 System icon 134 is selected, window 150 is displayed to the user to provide further possible selections (i.e. icons 164–180). In the depicted example, folder icon 146 has also been selected. Accordingly, folder window 186, which contains GAME icon 190 and TYPE icon 192, is also displayed to the user on desktop 132.

Windows 150 and 186 include conventional elements or controls such as a title bar 152, which identifies the contents of each window, and shrink and grow buttons 142 and 144, which are utilized to minimize (close) or maximize (set to full screen size) each of windows 150 and 186. Each of windows 150 and 186 also provides vertical and horizontal scrollbars 160 and 162, respectively, to enable a user to scroll through the contents of the corresponding window and a display area 188, upon which a plurality of icons can be displayed. Finally, windows 150 and 186 include resizing box 184, which enables a user to resize the associated one of windows 150 or 186 utilizing the familiar drag-and-drop technique.

Windows 150 and 186 are shown in a partially overlapped position. Typically, the topmost window is considered to be the "active" window or the window having the "focus" of the GUI. Sometimes, the topmost window is thus said to be at the "focus" position. As can be seen, when multiple windows begin to be opened up on the desktop, the effective screen "real estate" is used up and windows begin to overlap each other, especially as individual windows are resized. As additional windows are opened, a particular individual window may easily become "lost" behind other windows on the display. This is often frustrating for the user, who may be unable to locate a particular window when it becomes necessary to "pull" that window into focus on the desktop. Thus, for example, consider the situation where the user has opened multiple documents, each of which are being edited concurrently using multiple different instances of a word processing program. Even if each instance of the program were identified in a task bar or task list, it might be difficult for the user to determine which particular task window should be moved to the focus position (because, for example, multiple windows may have the same identifier in the list) to facilitate initiation or completion of a particular task or operation.

The present invention solves this problem and facilitates the user's navigation through multiple overlapped or hidden windows on a GUI through the use of a special graphical control device or "widget" displayed on the desktop. The control "widget" typically includes a plurality of control "positions" each of which is associated with a window (e.g., a task window) opened on the GUI. As additional windows are opened, new "positions" are added to the control. The control widget, however, is preferably not associated with any particular GUI window, and it may take on any convenient graphical display representation or format, such as a slider, a scrollbar, a knob, a listbox, or the like.

Figure 5A:
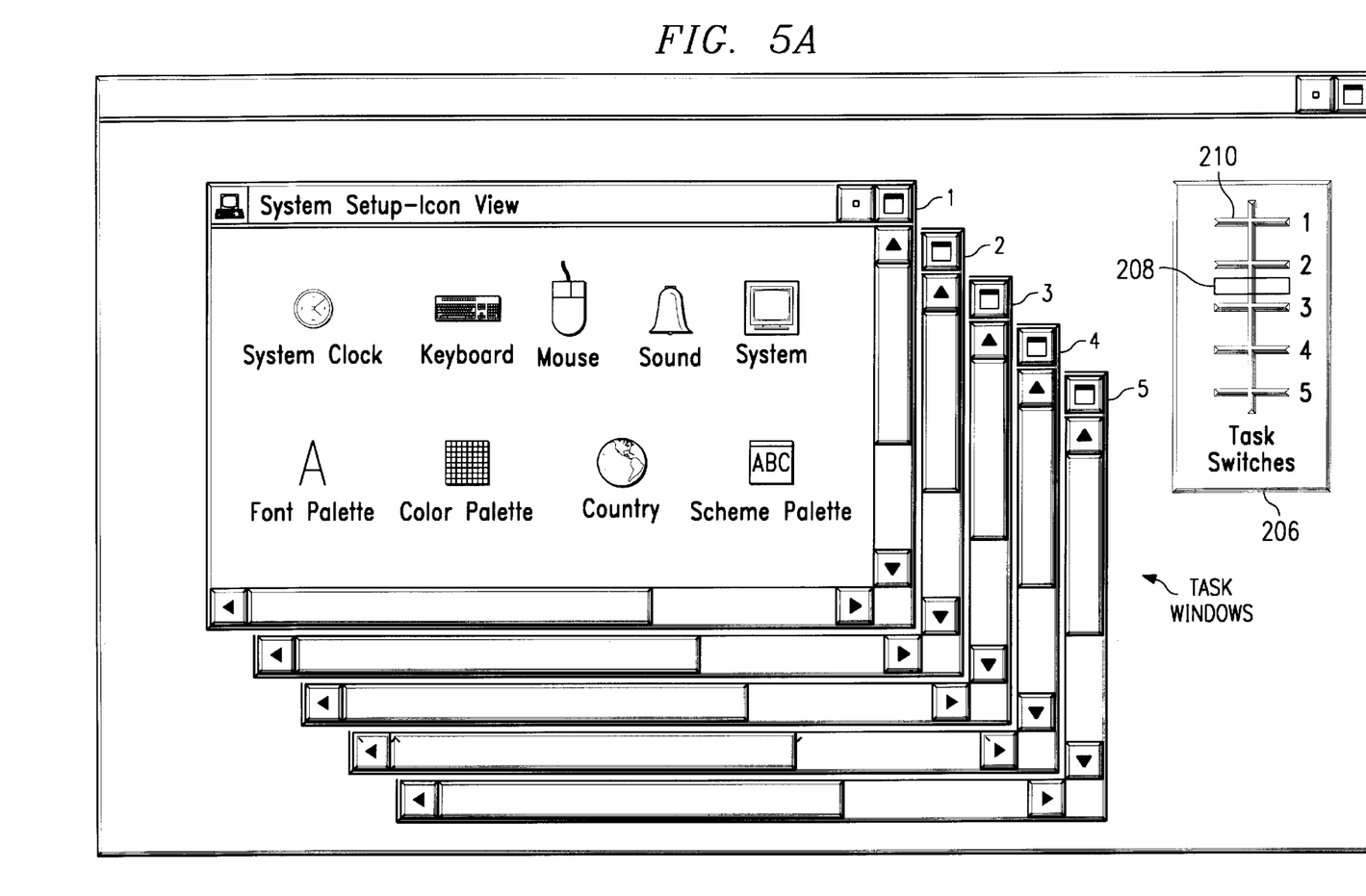
FIGS. 5A and 5B illustrate several representative versions of the graphical control device or widget of the present invention.
Figure 5B:
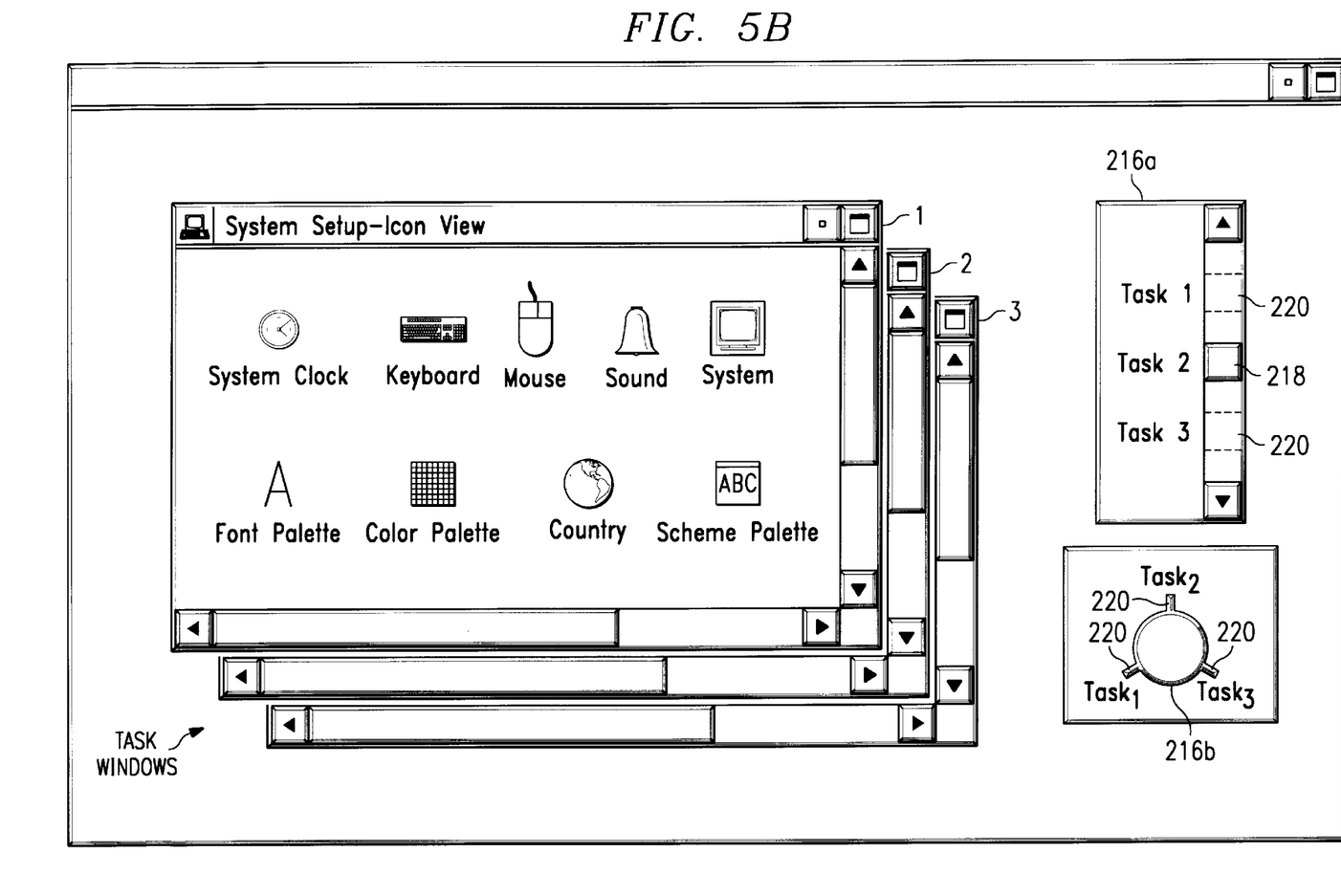

FIG. 5A illustrates the widget or "task switches" constructed as a "slider" control, which is preferred, and FIG. 5B illustrates the widget as a scrollbar. These examples, however, are merely illustrative of the inventive concept. In both case, however, it can be seen that the widget includes identifiers or "positions" that are identified with the open window(s) on the desktop. In operation, the user preferably positions the graphical display pointer over the control element (e.g., the slider or the scrollbar) and "drags" a control element thereof over one or more of the identifiers. As the user moves the control element over an identifier, a window associated therewith is brought into focus as the active window for at least a period of time while the control element is positioned on or adjacent the identifier position. As the control element moves to the next identifier position, a new window is immediately brought into the focus position, replacing the previous window. Thus, the control widget is linked to the window management control routines of the operating system kernel in a manner to prove a convenient and easy-to-use method of locating a particular window or task.

Referring now to FIG. 5A in particular, widget control 206 includes a slider 208 which a number of identifier positions identified thereon by notches 210 (marked "1"–"5"). Preferably, each notch position 210 is associated with a given one of the window(s) (or tasks) that have been opened on the GUI (or that are otherwise being run by the operating system) as illustrated. This one-to-one correspondence between "notches" and windows is not a limitation. Preferably, particular "position" identifiers are also ordered (from top to bottom, or from left to right depending on orientation of the widget) based on the order that the windows were opened on the GUI, a given hierarchy of tasks, some combination of the above, or any other particular ordering technique. Thus, in the example of FIG. 5A (where the widget is vertical), the oldest window is associated with a position at the bottom of the slider, and the newest window is associated with a position at the top of the slider. In particular, as each new window is opened on the GUI, typically the oldest window moves to the position farthest away from the focus. Thus, as each new window is opened on the GUI, a new position indicator is added at the top of the slider. Thus, the slider top-to-bottom positions preferably mimic the "depth" of the windows (namely, the "z-order") of the windows on the graphical user interface. This particular ordering, of course, is merely exemplary.

As also seen in FIG. 5A, the widget control 206 is illustrated as a standalone graphical display element, although it may be located or positioned (by the operating system or by the user) anywhere on the desktop including, without limitation, on or adjacent another task bar, menu, window, dialog box or other display element.

FIG. 5B illustrates several alternative representations of the widget control 216. Typically, only one control will be used. In the top embodiment, the widget control 216a comprises a scrollbar 218a with a number of positions identified thereon by identifiers 220. In the embodiment illustrated at the bottom, the widget control 216b with a number of positions identified thereon by identifiers 220. Preferably, as in the previous example, each identifier position 220 is associated with a given one of the window(s) (or tasks) that have been opened on the GUI (or that are otherwise being run by the operating system). The user grabs the scrollbar and moves this element in the standard manner. As the element traverses each identifier position 220, the associated task window is brought to the focal position.

The control widget may be implemented in any convenient graphical representation. Thus, for example, the control widget may take on any particular format provided the format has appropriate "positions" staked out thereon to delineate the various open windows on the GUI. Thus, the widget could take on any number of convenient forms, such as a representation of a listbox, a dialog box, an icon, an image (e.g., a .gif or .jpeg type), a bitmap, or even text or other such display information. Whatever "vehicle" is used for this purpose, the positional "identifiers" associated therewith must be linked to the open windows.

Figure 6A:
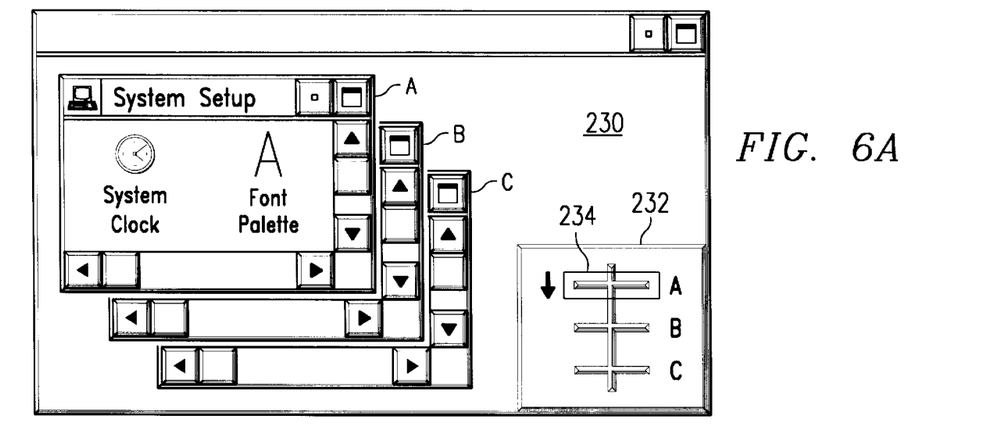
FIGS. 6A, 6B and 6C illustrate how the graphical control device is useful for switching between a plurality of task windows on a GUI.
Figure 6B:
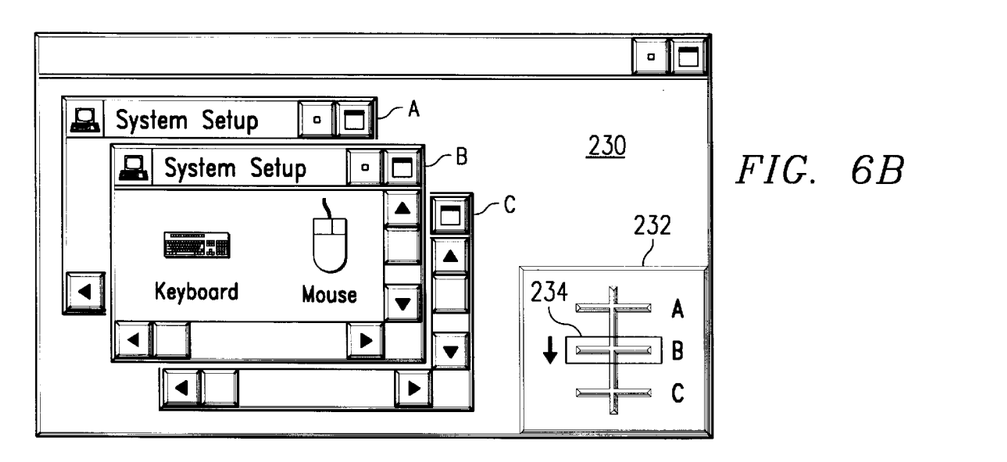
Figure 6C:
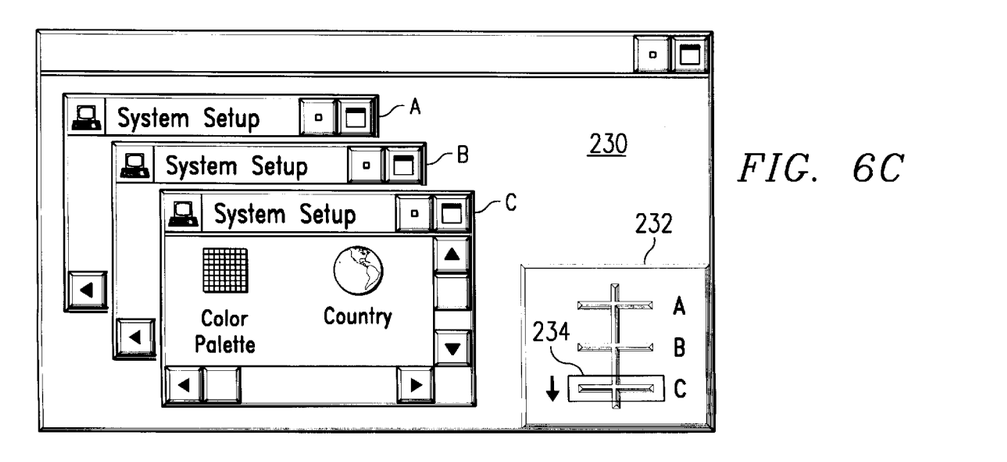

The operation of the present invention is now illustrated in FIGS. 6A–6C. In each of these figures, the GUI 230 includes three task windows A, B and C, and the associated graphical control device 232 or widget previously described. The format and position of device 232 is merely representative. As seen in FIG. 6A, window A has the focus, with windows B and C placed below window A. In this example, the slider control element 234 is located at element "A" by default. In operation, the user positions the graphical pointer on the control element, depresses the mouse button (to "grab" the control) and begins to move the control element downward. As the slider control element 234 approaches (within a given degree) or reaches the "B" notch, window B obtains the focus as seen in FIG. 6B. If the user then continues to move the slider control element 234, window C obtains the focus as the element approaches (within a given degree) or reaches the "C" notch. The degree to which the control element 234 must "approach" the next notch before the window focus is changed may be set by the system or is user-selectable. Also, it is not required that the user "grab" the control element 234 or that a control element even be used. The user could merely move the pointer over the notches, which may themselves be active elements. Alternatively, the user would "click" on a given notch to bring the associated task window into focus.

Thus, the invention provides a simple and efficient way to alter the focus on a windowing display environment. Generalizing, each window may be associated with a particular task of a set of tasks available to be run or currently being executed by a multitasking operating system (OS). Each task currently available is then identified by a notch or other indicator on the graphical control device. Thus, the widget is useful as a "task switcher" to enable the user to select a particular task executing in the windowing environment.

Figure 7:
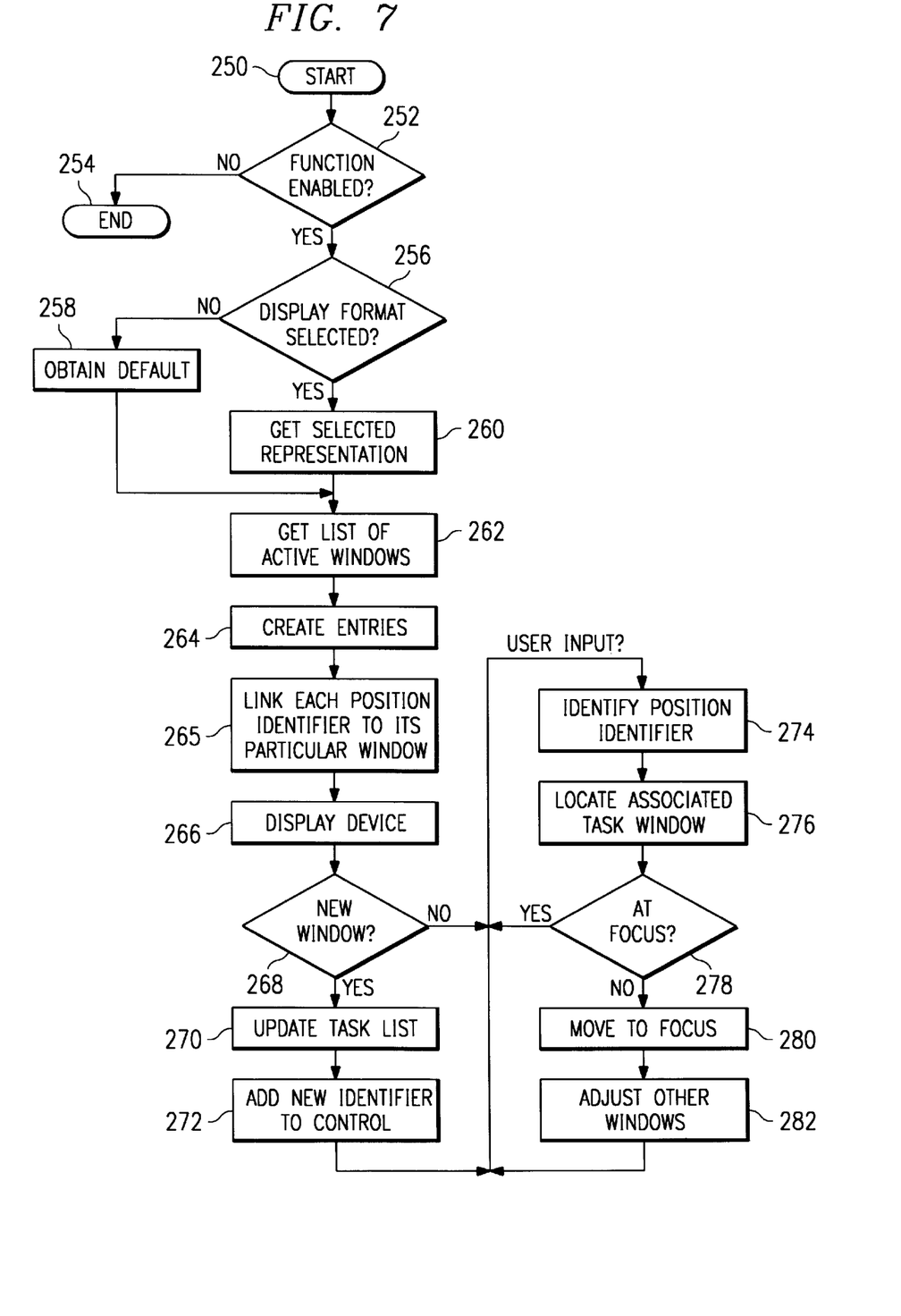
FIG. 7 is a flowchart depicting a preferred operation of the present invention.

Referring now to FIG. 7, there is depicted a high-level flowchart of a preferred embodiment of the method utilized by the present invention to use the slider control to switch between tasks. The method illustrated within FIG. 7 is preferably implemented in screen monitor module 114 within kernel 102 of operating system 100; however, those skilled in the art will recognize that the method illustrated in FIG. 7 may alternatively be implemented within a stand-alone routine. As illustrated, the process begins at block 250 and thereafter proceeds to block 252 at which a test is performed to determine whether the task switcher function is enabled. If not, the routine ends at step 254. If, however, the task switcher function is enabled, the routine continues at step 256 to determine whether the user has specified a particular display format for the widget. If the outcome of the test at step 256 is negative, the routine obtains the default representation, which is preferably a slider, at step 258. If the outcome of the test at step 256 is positive, the routine obtains the selected representation at step 260.

In either case, the routine then continues at step 262 to obtain a list of all active windows. Typically, this list is obtained from a window management routine. At step 264, the task switcher routine creates an entry in a task list for each active window. Each entry is then assigned a position identifier (e.g., a notch) on the graphical control device. At step 265, each position identifier is "linked" to a particular window. At step 266, the control device having the appropriate number of identifiers is displayed on the GUI. The routine then waits for a system input or some user input. In particular, at step 268, a test is performed to determine whether a new window has been opened. If so, the routine updates the task list at step 270 and adds a new position identifier to the control device at step 272. If, however, the outcome of the test at step 268 is negative, the routine continues to wait for user input.

It is now assumed that the user has accessed the control device (e.g., by grabbing the control element thereof, by performing a mouseover with respect to a notch, or the like). At step 274, the routine identifies the position identifier being accessed. At step 276, a window associated with the position identifier is located. A test is then done at step 278 to determine whether the identified window is at the focus position. If so, the routine returns to step 274. If, however, the outcome of the test at step 278 indicates that the identified window is not at the focus position, the routine continues at step 280 to place the window at this position. At step 282, the remaining windows are preferably moved down the hierarchy in a topdown fashion. Thus, the window that was at the focus position is moved to next lowest position, and so on. Any particular reordering scheme may be used at step 282 to facilitate subsequent rendering of the windows on the GUI. After step 282, control is returned to step 274 to wait for further changes.

As has been described, the present invention provides an improved method and system for enabling a user to navigate though a plurality open task windows within a graphical user interface. In particular, the present invention enables a user to easily locate, access and bring into focus a particular task window. Thus, the invention facilitates task switching in a manner that has not been available in the art. The inventive technique enhances the appeal of the graphical user interface as an intuitive and user-friendly method of interacting with a data processing system.

Many variations of the inventive concept are encompassed within the basic techniques previously described. Thus, as described, the graphical display control may be of any convenient display representation or format. The individual control "positions" or "identifiers" may require for activation that the control element (e.g., the slider bar or merely the pointer itself) be in a predetermined relationship with the identifier (i.e. directly on top) or within a certain position relative thereto. Depending on where the control widget is located, it may not be necessary to hold down any control button on the graphical pointing device (e.g., the mouse); rather, the control widget (e.g., the slider) itself may be active such that a "mouseover" function with respect to any identifier (e.g., a "notch") causes the associated task window to be brought into the focus position. This latter approach is especially useful when a plurality of Web browser windows are opened on the GUI as the control widget may then be constructed as a client-side image map using the well-known <ISMAP> HTML tag. All such variations are within the scope of the present invention.

As described above, aspects of the present invention pertain to specific "method steps" implementable on computer systems. In an alternate embodiment, the invention may be implemented as a computer program product for use with a computer system. Those skilled in the art should readily appreciate that programs defining the functions of the present invention can be delivered to a computer in many forms, which include, but are not limited to: (a) information permanently stored on non-writable storage media (e.g. read only memory devices within a computer such as ROM 86 or optical disks readable by CD-ROM drive 24); (b) information alterably stored on writable storage media (e.g., floppy disks within diskette drive 22 or hard disk drive 24); or (c) information conveyed to a computer through communication media, such as through a computer or telephone network. It should be understood, therefore, that such media, when carrying computer readable instructions that direct the method functions of the present invention, represent alternate embodiments of the present invention.

While the invention has been particularly shown and described with reference to a preferred embodiment, it will be understood by those skilled in the art that various changes in form and detail may be made therein without departing from the spirit and scope of the invention.

What is claimed is:

1. A method for managing a plurality of windows organized and displayed on a graphical user interface of a computer, the method comprising the steps of:

displaying a graphical control device on the graphical user interface, the graphical control device having a plurality of identifiers;

linking each identifier with a given one of the plurality of windows;

as a user of a graphical pointing device moves a graphical pointer adjacent to an identifier in the graphical control device, determining whether the window linked to the identifier is at a focus of the graphical user interface;

if the window linked to the identifier is not at the focus, automatically bringing the window to the focus irrespective of whether the user also activates a control function using the graphical pointing device; and adjusting an order of the remaining windows.

2. The method as described in claim 1 wherein the window is positioned at the focus of the graphical user interface as the graphical pointer traverses the identifier linked with the window.

3. The method as described in claim 1 wherein an application is associated with each of the plurality of windows.

4. The method as described in claim 1 wherein the graphical control device is a slider.

5. The method as described in claim 4 wherein each identifier is a notch on the slider.

6. The method as described in claim 1 wherein the graphical control device is a scrollbar.

7. The method as described in claim 1 wherein the graphical control device is a representation of a knob.

8. A method for accessing tasks executing in a computer, each of the tasks having a graphical user interface task window associated therewith, the method comprising the steps of:
   displaying a graphical control device on the graphical user interface, the graphical control device having a plurality of identifiers;
   linking each identifier with a given one of the plurality of task windows;
   as a user of a graphical pointing device moves a graphical pointer adjacent to an identifier in the graphical control device, determining whether the task window linked to the identifier is at a focus of the graphical user interface;
   if the task window linked to the identifier is not at the focus, automatically bringing the task window to the focus irrespective of whether the user also activates a control function using the graphical pointing device; and
   taking a predetermined action with respect to a given task window after that task window has been selectively positioned at the focus of the graphical user interface.

9. The method as described in claim 8 wherein the task window is positioned at the focus of the graphical user interface as the graphical pointer traverses the identifier linked to the task window.

10. The method as described in claim 8 wherein the graphical control device is a slider.

11. The method as described in claim 10 wherein each identifier is a notch on the slider.

12. The method as described in claim 8 wherein the graphical control device is a scrollbar.

13. The method as described in claim 8 wherein the graphical control device is a representation of a knob.

14. A computer program product in computer-readable medium for managing a plurality of windows organized and displayed on a graphical user interface of a computer, the computer program product comprising:
   instructions for generating and displaying a graphical control device on the graphical user interface, the graphical control device having a plurality of identifiers;
   instructions for linking each identifier with a given one of the plurality of windows;
   instructions, responsive to a user of a graphical pointing device moving a graphical pointer adjacent to an identifier in the graphical control device for determining whether the window linked to the identifier is at a focus of the graphical user interface;
   instructions, responsive to a determination that the window linked to the identifier is not at the focus for automatically bringing the window to the focus irrespective of whether the user also activates a control function using the graphical pointing device; and
   instructions for adjusting an order of the remaining windows.

15. The computer program product as described in claim 14 wherein the graphical control device is a slider and each identifier is a notch on the slider.

16. The computer program product as described in claim 14 wherein the graphical control device is a scrollbar.

17. The computer program product as described in claim 14 wherein the graphical control device is a knob.

18. A computer program product in computer-readable medium for managing access to tasks executing in a computer, each of the tasks having a graphical user interface task window associated therewith, the computer program product comprising:
   instructions for displaying a graphical control device on the graphical user interface, the graphical control device having a plurality of identifiers;
   instructions for linking each identifier with a given one of the plurality of task windows;
   instructions, responsive to a user of a graphical pointing device moving a graphical pointer adjacent to an identifier in the graphical control device for determining whether the task window linked to the identifier is at a focus of the graphical user interface; and
   instructions responsive to a determination that the task window linked to the identifier is not at the focus for automatically bringing the task window to the focus irrespective of whether the user also activates a control function using the graphical pointing device.

19. The computer program product as described in claim 18 wherein the graphical control device is a slider.

20. The computer program product as described in claim 18 wherein the graphical control device is a scrollbar.

21. The computer program product as described in claim 18 wherein the graphical control device is a knob.

22. A computer, comprising:
   a processor;
   an operating system;
   a display having a graphical user interface;
   a graphical pointing device for controlling display and positioning of a graphical pointer on the graphical user interface; and
   display control means executed by the processor for managing access to tasks executing in the computer, each of the tasks having a graphical user interface task window associated therewith, wherein the display control means comprises:
   means for traversing the graphical pointer from a first position to a second position relative to a graphical control device displayed on the graphical user interface; and
   means responsive to the traversing means (a) for positioning a first task window at a focus of the graphical user interface as the graphical pointer traverses a first identifier on the graphical control device, and (b) for positioning a second task window at the focus in place of the first task window as the graphical pointer traverses a second identifier irrespective of whether a user also activates a control function using the graphical pointing device as the graphical pointer traverses the respective identifiers.

23. A method for managing a plurality of open windows organized and displayed on a graphical user interface of a computer, the method comprising the steps of:

for each open window, linking each of a plurality of positions in a graphical control device to a selected one of the plurality of open windows; and as a graphical pointer is moved across each of the plurality of positions in the graphical control device, selectively positioning a given one of the open windows at a focus position of the graphical user interface, wherein the given open window is positioned at the focus position as the graphical pointer traverses the position in the graphical control device linked to the given open window irrespective of whether a user also activates a control function using the graphical pointing device.

24. The method as described in claim 23 wherein an application is associated with each of the plurality of open windows.

25. The method as described in claim 23 wherein the graphical control device is a graphical representation of a slider.

26. A method for managing a plurality of windows organized and displayed on a graphical user interface of a computer, the method comprising the steps of:

displaying a graphical control device on the graphical user interface, the graphical control device having a plurality of identifiers;

linking each identifier with a given one of the plurality of windows;

receiving an indication of access of the graphical control device;

receiving a selection of a first identifier of the plurality of identifiers;

temporarily displaying a first window linked to the first identifier as a focus in response to the selection of the first identifier;

receiving a change of selection from the first identifier to a second identifier of the plurality of identifiers;

temporarily displaying a second window linked to the second identifier as the focus in response to the change of selection;

receiving an indication that access of the graphical control device is relinquished; and establishing the second window as the focus in response to access of the graphical control device being relinquished.

27. The method of claim 26, further comprising adjusting an order of the plurality of windows.

28. The method of claim 26, further comprising taking a predetermined action with respect to the second window after the second window has been established as the focus of the graphical user interface.

29. The method of claim 26, wherein the step of receiving an indication of access of the graphical control device comprises receiving an indication that a control element is engaged using a graphical pointing device.

30. The method of claim 29, wherein the step of receiving the selection of the first identifier comprises receiving an indication that the control element is moved adjacent to the first identifier.

31. The method of claim 29, wherein the step of receiving the change of selection comprises receiving an indication that the control element is moved from a position adjacent to the first identifier to a position adjacent to the second identifier.

32. The method of claim 29, wherein the step of receiving an indication that access of the graphical control device is relinquished comprises receiving an indication that the control element is disengaged using the graphical pointing device.

33. The method of claim 26, wherein the step of receiving an indication of access of the graphical control device comprises receiving an indication that graphical pointer is moved over the graphical control device using a graphical pointing device.

34. The method of claim 33, wherein the step of receiving the selection of the first identifier comprises receiving an indication that the graphical pointer is moved adjacent to the first identifier.

35. The method of claim 33, wherein the step of receiving the change selection comprises receiving an indication that the graphical pointer is moved from a position adjacent the first identifier to a position adjacent to the second identifier.

36. The method of claim 33, wherein the step of receiving an indication that access of the graphical control device is relinquished comprises receiving an indication that the graphical pointer is moved so that it is not over the graphical control device.

37. An apparatus for managing a plurality of windows organized and displayed on a graphical user interface of a computer, comprising:

means for displaying a graphical control device on the graphical user interface, the graphical control device having a plurality of identifiers;

means for linking each identifier with a given one of the plurality of windows;

means for receiving an indication of access of the graphical control device;

means for receiving a selection of a first identifier of the plurality of identifiers;

means for temporarily displaying a first window linked to the first identifier as a focus in response to the selection of the first identifier;

means for receiving a change of selection from the first identifier to a second identifier of the plurality of identifiers;

means for temporarily displaying a second window linked to the second identifier as the focus in response to the change of selection;

means for receiving an indication that access of the graphical control device is relinquished; and means for establishing the second window as the focus in response to access of the graphical control device being relinquished.

38. The apparatus of claim 37, wherein the means for receiving an indication of access of the graphical control device comprises means for receiving an indication that a control element is engaged using a graphical pointing device.

39. The apparatus of claim 38, wherein the means for receiving the selection of the first identifier comprises means for receiving an indication that the control element is moved to a position adjacent to the first identifier.

40. The apparatus of claim 38, wherein the means for receiving the change of selection comprises means for receiving an indication that the control element is moved from a position adjacent to the first identifier to a position adjacent to the second identifier.

41. The apparatus of claim 38, wherein the means for receiving an indication that access of the graphical control device is relinquished comprises means for receiving an indication that the control element is disengaged using the graphical pointing device.

42. The apparatus of claim 37, wherein the means for receiving an indication of access of the graphical control device comprises means for receiving an indication that graphical pointer is moved over the graphical control device using a graphical pointing device.

43. The apparatus of claim 42, wherein the means for receiving the selection of the first identifier comprises means for receiving an indication that the graphical pointer is moved to a position adjacent to the first identifier.

44. The apparatus of claim 42, wherein the means for receiving the change of selection comprises means for receiving an indication that the graphical pointer is moved from a position adjacent to the first identifier to a position adjacent to the second identifier.

45. The apparatus of claim 42, wherein the means for receiving an indication that access of the graphical control device is relinquished comprises means for receiving an indication that the graphical pointer is moved so that it is not over the graphical control device.

46. A computer program product, in a computer readable medium, for managing a plurality of windows organized and displayed on a graphical user interface of a computer, comprising:

instructions for displaying a graphical control device on the graphical user interface, the graphical control device having a plurality of identifiers;

instructions for linking each identifier with a given one of the plurality of windows;

instructions for receiving an indication of access of the graphical control device;

instructions for receiving a selection of a first identifier of the plurality of identifiers;

instructions for temporarily displaying a first window linked to the first identifier as a focus in response to the selection of the first identifier;

instructions for receiving a change of selection from the first identifier to a second identifier of the plurality of identifiers;

instructions for temporarily displaying a second window liiked to the second identifier as the focus in response to the change of selection;

instructions for receiving an indication that access of the graphical control device is relinquished; and     instructions for establishing the second window as the focus in response to access of the graphical control device being relinquished.

* * * * *